United States Patent [19]

Lynch, Jr. et al.

[11] 4,075,688
[45] Feb. 21, 1978

[54] SYSTEM FOR ADDRESSING AND ADDRESS INCREMENTING OF ARITHMETIC UNIT SEQUENCE CONTROL SYSTEM

[75] Inventors: David D. Lynch, Jr., Northridge; Lee W. Tower, Los Angeles, both of Calif.

[73] Assignee: Hughes Aircraft Company, Culver City, Calif.

[21] Appl. No.: 718,443

[22] Filed: Aug. 26, 1976

Related U.S. Application Data

[62] Division of Ser. No. 454,339, March 25, 1974, Pat. No. 4,025,771.

[51] Int. Cl.² .......................... G06F 9/20; G06F 13/00
[52] U.S. Cl. .................................................... 364/200
[58] Field of Search ..................... 340/172.5; 364/200, 364/900

[56] References Cited

U.S. PATENT DOCUMENTS

| | | | |
|---|---|---|---|
| 3,297,998 | 1/1967 | Klein | 340/172.5 |
| 3,359,544 | 12/1967 | Macon | 340/172.5 |
| 3,378,819 | 4/1968 | Hannicq | 340/172.5 |
| 3,425,039 | 1/1969 | Bahrs | 340/172.5 |
| 3,426,329 | 2/1969 | Marx | 340/172.5 |
| 3,444,527 | 5/1969 | Hartley | 340/172.5 |
| 3,461,433 | 8/1969 | Emerson | 340/172.5 |
| 3,634,883 | 1/1972 | Kreidermacher | 340/172.5 |

*Primary Examiner*—James D. Thomas
*Attorney, Agent, or Firm*—Walter J. Adam; W. H. MacAllister

[57] ABSTRACT

Control for overlapping instruction execution in an arithmetic unit is provided by stepping a sequence of instructions through a plurality of registers connected in cascade and separately decoding each instruction in a register for control of a corresponding stage in one or more data processing paths, each comprising stages through which data being processed is stepped, each stage corresponding to only one register of the control pipeline. The output of the decoder of each instruction register controls the required operations in the corresponding stage of the data pipeline. Automatically indexed indirect addressing is provided by use of pointers for data sources and destinations as required in the execution of every instruction in order to facilitate highly iterative and structured operations on blocks or arrays of data.

7 Claims, 6 Drawing Figures

SYSTEM FOR ADDRESSING AND ADDRESS INCREMENTING OF ARITHMETIC UNIT SEQUENCE CONTROL SYSTEM

This application is a divisional application of copending application Ser. No. 454,339, filed Mar. 25, 1974, now U.S. Pat. No. 4,025,771.

BACKGROUND OF THE INVENTION

This invention relates to programmable digital data processors, and more particularly to a sequence control unit (CU) for an arithmetic unit (AU) which permits optimum overlapping of the execution of instructions.

In many applications it is necessary to process large quantities of iterative data (blocks or arrays) in a predetermined manner in real time. If the data are continually changing, such as the in the processing of radar or sonar signals, the finite time required to process the data becomes significant. That is particularly true in modern systems having large arrays of data to be processed.

Within the last few years, the design of digital signal processors has undergone major transitions. The first digital signal processors were dynamically structurable under the supervision of a general purpose computer or a special purpose signal processor controller. The signal processors, however, were special purpose in nature and not readily adaptable to a wide variety of applications.

The next step in the development of digital signal processors, made possible by advances in integrated circuit technology, was the design of signal processors which could be programmed directly. These programmable signal processors were characterized by multiple memories, powerful arithmetic units, and pipelined instruction streams with conventional instruction decoding. The limitation on these processors was the inflexibility of their instruction sets. The instruction requirements for different signal processing applications are almost always different. For example, one application may require a very efficient complex multiplication while another requires a very efficient way of developing a "dot product". This leads to the design of programmable signal processors especially adapted to different applications.

For real time signal processor applications, it is necessary to have efficient instruction sets so that the processing can be completed in real time. However, even efficient instruction sets will not yield the optimum in speed of processing. For the optimum, it would be necessary to have not only pipelined instruction streams, but to also have execution of the instructions in the pipeline overlapping so that execution of more than one instruction is in progress simultaneously, and ideally to have the execution of one instruction completed every clock cycle such that, once the instruction pipeline is filled, there is an instruction completed every clock cycle. In the past, the instruction sequence control unit has merely permitted another instruction to be fetched and decoded while the current instruction is being executed.

SUMMARY OF THE INVENTION

In accordance with the present invention, multiple paths or pipelines are provided, one or more for processing the data, and one for processing the instructions which control the data processing. These pipelines allow greatly increased instruction execution rates and therefore greatly increased data processing rates because execution of more than one instruction requiring more than one clock cycle may be in progress. This is accomplished by providing a chain of registers in the control pipeline through which all instructions are stepped, one following the other every clock pulse, and an instruction decoder connected to each register such that, at each stage or phase of the instruction pipeline provided by the chained registers, the necessary control signals for the overlapping execution of instructions are provided at different stages of a data processing path in an arithmetic unit. The arithmetic unit is organized to execute instructions in stages or phases, each phase corresponding to one stage of the control pipeline. An instruction operation that requires more than one clock pulse period is effectively spread over more than one phase or stage of the data processing path involved to keep the data in phase with its controlling instruction in the control pipeline. An instruction which requires an indeterminate number of clock pulse periods at a particular stage is detected, and that detected condition is used to inhibit clock pulses to inhibit transfer of instructions in the control pipeline up through the register holding that instruction. When an instruction in the last register of the control pipeline calls for storing a data processing result in a memory which gives rise to a memory access conflict with an instruction upstream calling for memory access, the instruction in the last register is given priority and all flow of instructions toward that last register is frozen for one clock cycle to permit execution. In that manner the data flow pipeline is always the same effective length as the control pipeline such that as each instruction emerges from the control pipeline, the data affected by the operations called for by the instructions are available at the output of the data pipeline.

Another feature of the present invention is the provision of automatically indexed, indirect addressing for every instruction such that the sources and destinations of the processed data are designated by always addressing pointers the contents of which in turn specify the memory addresses of the data sources and destinations. The pointers may be preset, such as to zero, and incremented by a number each time an instruction requiring access to memory is executed, until a programmable number has been reached. That facilitates programming iterative subroutines for processing a block or array of data. Once the programmable number has been reached by the pointers, a branch instruction at the end of the iterative subroutine will permit instructions of another routine to commence their progress through the control pipeline. At the beginning of the next iterative subroutine, the pointers are again reset under control os appropriate instructions flowing through the control pipeline.

The novel features that are considered characteristic of this invention are set forth with particularity in the appended claims. The invention will best be understood from the following description when read in conjunction with the accompanying drawings.

DESCRIPTION OF THE PREFERRED EMBODIMENTS

Figure 1:
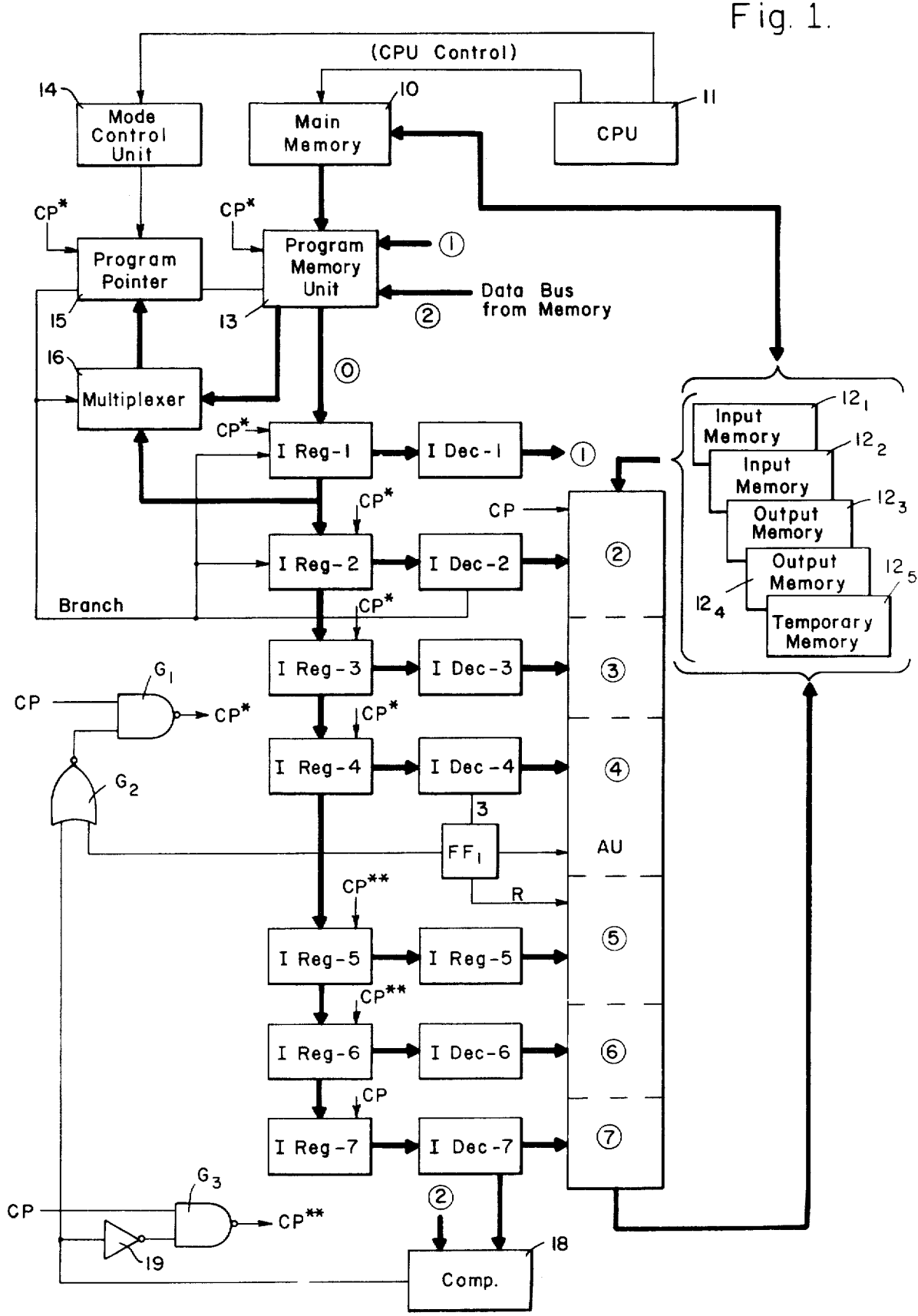
FIG. 1 is a block diagram of a data processing system having a control pipeline and a data pipeline in accordance with the present invention.

Referring now to FIG. 1, there is shown a synchronous data processing system comprising a main (bulk) memory 10 of a central processing unit 11, and a plurality of auxiliary memories, such as input memories $12_1$ and $12_2$, output memories $12_3$ and $12_4$, and a temporary memory $12_5$. The transfer of blocks, or arrays of data between the main memory and the auxiliary memories is controlled by the central processing unit (CPU) in the customary manner. The CPU also controls transfer of blocks of instructions from the main memory to a program memory unit 13.

The main memory may be a random access core memory, or a magnetic disc memory, of the type in common use for bulk storage. The auxiliary memories and the program memory are preferably solid state memories of the nondestructive readout type which, once stored with data and instructions, can be read without loss of what has been previously stored and read, and without requiring a clock cycle for what has just been read to be restored. In that manner each memory access will require a minimum of time less than the system clock period of, for example, 50 nanoseconds. By limiting each memory access cycle to just one clock cycle, simple, high speed memory operation is provided for apid and reliable data processing at the system clock rate which can be typically 20 MHz.

The transfer of a block of instructions to the program memory unit is made while a mode control unit 14 is set to "load" by the CPU. In its simplest form, that control unit may be a synchronous set-reset flip-flop that resets a program pointer 15 to zero. That program pointer is incremented as instructions are transferred to successive program memory locations. Once a block transfer is complete, the mode control unit is set to "run", and the program pointer is again reset to zero or some starting value. As will be described more fully hereinafter with reference to FIG. 2, the program pointer 15 may be set to address any instruction location in the program memory unit in response to an instruction read into an instruction register IREG-1 in order to skip or branch in the program as stored. The program which may use the present invention to the greatest advantage is one that calls for highly iterative and structured operations characteristic of, for example, radar or sonar signal processing, although obviously the data may be commercial or scientific in special applications.

In its broadest aspects, the concept of the invention is to provide multiple paths or pipelines, one or more for the data to be processed, and one for the instructions controlling the data processing. The latter is comprised of the input instruction register IREG-1 followed by a plurality of cascaded (chained) registers IREG-2 through IREG-7, and a plurality of decoders IDEC-1 through IDEC-7, one connected to each instruction register. As instructions are read from the program memory unit, they are stepped in sequence through these seven registers in response to system clock pulses such that, after seven clock cycles of the control pipeline, the first instruction read is stepped out of the last register in the chain, and thereafter one instruction is stepped out every clock cycle.

At each stage in the progress of an instruction through the control pipeline, the instruction is decoded by its associated instruction decoder IDEC-$n$, where $n$ is a number corresponding to the number of the instruction register in the chain. The output of the decoders control the processing of the data through an arithmetic unit 17 in phases, one phase for each stage of the control pipeline such that, after seven consecutive clock pulses (CP), an instruction has flowed through the control pipeline and all of the operations called for by it have been completed.

System clock pulses are applied to the arithmetic unit (AU) from a source (not shown) without interruption to advance the processing of data through a data pipeline. The same clock pulses are normally applied to the instruction registers so that in seven clock cycles, an instruction passes through the control pipeline and the data processed by the instruction emerges from the data pipeline in the AU in seven clock cycles. However, some instructions may require that the control pipeline be frozen at and above a certain level to permit data processing under control of an instruction at that certain level to be completed. For example, an instruction to divide requires an indeterminate number of cycles when carried out by the conventional trial and error ("longhand") methods. Consequently, when that instruction is decoded at the appropriate level for the division to begin, clock pulses to that level and above are inhibited. Assuming that level to be phase 4 of the control pipeline, the decoder IDEC-4 detects that the instruction is to divide and sets a flip-flop $FF_1$ which transmits a signal to a NAND gate $G_1$ through a NOR gate $G_2$ to inhibit clock pulses applied to the registers IREG-1 through -4. Instructions ahead of that may proceed to completion in the usual manner.

Another example of a need to freeze part of the control pipeline is when one instruction in register IREG-2 requires access to the same memory to read an operand as an instruction in the register IREG-7 to store. A comparator 18 detects that condition and transmits an inhibit signal to gates $G_1$, $G_2$ and $G_3$ to inhibit clock pulses to the registers IREG-1 through -4 (CP*) and to register IREG-5 and -6 (CP**). The gate $G_3$ is also a NAND gate so an inverter 19 is employed to provide the inversion corresponding to that of the NOR gate $G_2$. The result of inhibiting clock pulses in this second example is to permit the instruction in the register IREG-7 to proceed to completion because it precedes the instruction that gives rise to the conflict. To attempt to resolve the conflict by giving the instruction in the earlier register IREG-2 priority would then require the entire pipeline to be frozen until the instruction in the register IREG-7 is executed next. Therefore, a cardinal rule of this concept is that, in the event of conflict, the instruction downstream has priority.

Circled numbers in dotted line sections of the AU represent the stages or phases in the data pipelines through the AU corresponding to the controlling stages of the control pipeline. An arrow with a circled number into a component, such as the program memory unit 13, therefore indicates that the controlling input to the component comes from the decoder of that stage of the control pipeline of the same number. That is made clear in this example by labeling the output of the decoder IDEC-1 with a circled number 1 to correspond with the control input to the program memory unit.

A circled number beside signal paths indicate the phase of the control pipeline during which the signals are transmitted. For example, to transfer a word from memory into the program memory unit, the instruction is read into the register IREG-1 from memory during an initial phase 0. During phase 2, that instruction is executed by transferring the word from the designated memory location to the destination also designated by the instruction. Control of the program memory unit during phase 1 is for execution of branch instructions as will be described with reference to FIG. 2.

This convention in the use of circled numbers will follow in the remaining FIGS. 2–5. The lines associated with these circled numbers are usually parallel bus lines represented by double parallel lines to suggest a "cable " of individual lines, except where a single line is shown to represent a single control signal. All data and instruction transfers are in parallel, and all but simple control functions employ a plurality of lines from a decoder to a unit or section being controlled.

Most instructions will not require more than seven system clock cycles to complete and time is not lost as to those that do not because once the pipeline is filled, there is one instruction completed with every clock pulse applied to the register IREG-7 except for those times an instruction requires more than seven clock pulses, such as the examples cited above. An example of a typical instruction which requires only one step would be to transfer a value from one register to another in the arithmetic unit. The actual transfer would be made at the appropriate level in the data pipeline according to how the data pipeline is organized. In other words, the operation code of the instruction would be decoded and made effective by the decoder associated with the instruction register of the data pipeline at the same level as the register storing the value. Another more specific example of a one-cycle instruction would be to load a coefficient into a register for use as a multiplier. Once entered into the second instruction register IREG-2 from the program memory unit, the decoder IDEC-2 decodes the operation code and the address code to enable the value to be fetched from memory and entered into the specified register in response to the next clock pulse which advances the instruction to the next register IREG-3.

It should be noted that two clock cycles precede execution of that instruction, a first clock cycle (phase 0) required to fetch the instruction into the first register IREG-1, and a second clock cycle (phase 1) during which the instruction passes into the second register in the pipeline. However, the effective time of execution for the instruction is only one cycle since another instruction fetched from the program memory unit is entered into the register IREG-1 while the instruction to load the coefficient is being transferred to the instruction register IREG-2. Following that, the instruction to load the coefficient is stepped through the remaining registers in the control pipeline and eventually stepped out of the last register.

During the same cycle that an instruction is read into the first register, operations called for by instructions which preceded the one being read into the first register are decoded and performed as required. During the next cycle, all of the instructions are advanced one stage in the pipeline. The instruction in the last register is stepped out and discarded since all operations it calls for have by then been completed.

Figure 3:
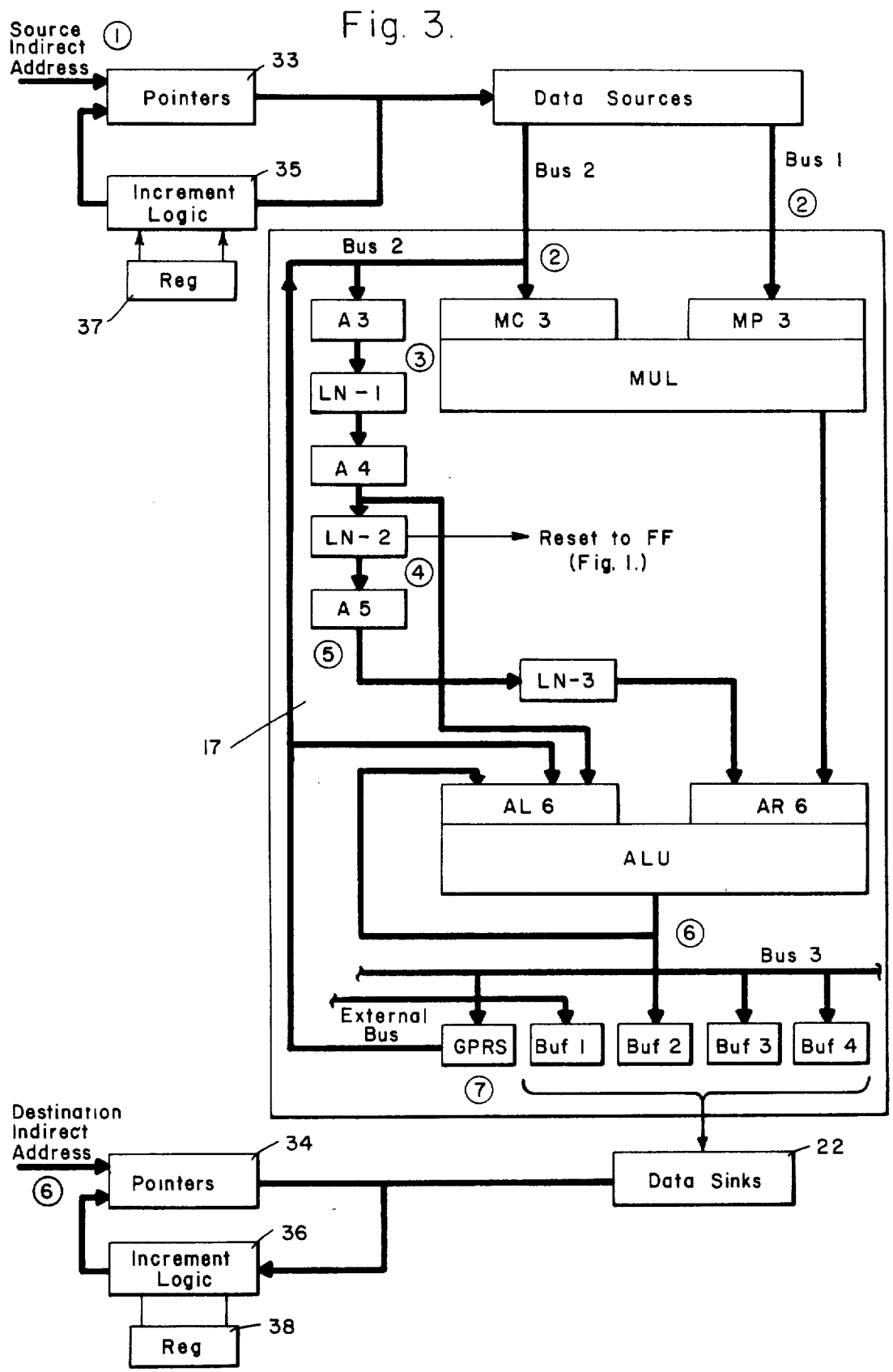
FIG. 3 illustrates the organization of an exemplary arithmetic unit constituting the data pipeline in the system of FIG. 1, and further illustrating the concept of automatically indexed indirect addressing which may be provided for the arithmetic unit as a further feature of the present invention.

As noted hereinbefore, the first stage (register IREG-1 and its associated decoder IDEC-1) provides for decoding branch instructions. The second stage of the control pipeline is devoted to fetching operands, and executing any branches which have been decoded in the first stage. Operands fetched during this phase 2 are stored in registers at the level or stage of the data pipeline corresponding to the second phase of the control pipeline. The register thus loaded in the case of multiplication instruction is the multiplicand MC3 of a full parallel multiplier MUL, as shown in FIG. 3 which illustrates an exemplary organization for the AU. The multiplier has already been entered into a register MP3 as a result of some prior operation or instruction.

If the operand is not to be the multiplicand for multiplication, it is entered into a register A3 during phase 2 of the control pipeline. Any operand entered into the register A3 is advanced to a register A4 through a logic network LN-1 during phase 3 as the corresponding instruction is advanced to the third stage of the control pipeline. During phase 4 of the control pipeline, the content of the register A4 is transferred through a logic network LN-2 to the register A5. A transfer may also be made directly from the register A4 to a register AL6 when the logic network LN-2 is not to be used. That network is for division which requires an indeterminate number of clock cycles. Consequently, phase 4 of the divide instruction may be any number of clock cycles, but the control pipeline is frozen from that level up. The logic network LN-1 is for such operations as "shift," which require only one clock cycle to complete. Phase 5 of the control pipeline loads input registers AL6 and AR6 of an arithmetic and logic unit (ALU) so that the appropriate operand for the arithmetic or logic operations of an instruction in the register IREG-6 of the control pipeline will be available for phase 6 execution. The register AR6 may be loaded from either register A5 or from the output of the multiplier MUL. Besides controlling the arithmetic and logic unit ALU, phase 6 also provides outputs to a bank of general purpose registers GPRs, one (BUF2) of two buffer registers BUF1 and BUF2 which interface with the input memories $12_1$ and $12_2$, a buffer register BUF3 which interfaces with the temporary storage memory $12_3$ and an output buffer register BUF4 which interfaces with the output memories. Transfer of data to the memories occurs during phase 7 under control of the instruction which is then in the register IREG-7 of the control pipeline. Transfer of data to the input memories through the buffer BUF1 is through an external bus while the mode control unit 14 holds the control pipeline inoperative under programmed control of the CPU.

As noted hereinbefore, each of the eight phases of instruction execution in the control pipeline is depicted in FIG. 1 by a circled number 0 through 7. A corresponding circled number in FIG. 3 indicates the stage in the data pipeline which the instruction controls. By this convention, the number $i$ associated with a paired register and decoder indicates to what level the data is advanced under control of the decoder during the phase identified by the same number $i$. At the end of that phase, i.e., at the end of the clock cycle period, the data are entered in the registers at the next level $i + 1$ if that is what the instruction in the instruction register IREG-*i* requires. Otherwise no transfer of data takes place. For example, the operand fetched during phase 2 of a multiply instruction is available at the inputs to the multiplicand register MC3 at the end of phase 2, and is entered in the register by the next clock which starts the phase 3 period, the execute phase of this instruction. During the next two successive clock pulses, the multiply instruction produces no control signals at outputs of decoders IDEC-3 and -4. During phase 5, the multiply instruction produces a control signal at the outputs of the decoder IDEC-5 which causes the product to be entered into the register AR6 by the next clock pulse that marks the beginning of phase 6, and clears the register MC3. This delay of two clock cycles between the execution of the multiply instruction and entry of the product into the register AR6 is provided to allow sufficient time for carries to propogate in the parallel multiplier MUL. The multiplier is retained in the register MP3 until replaced by a load instruction. In that way a single coefficient loaded once may serve as the multiplier for an entire array of data.

To summarize the data pipeline, operands are fetched in phase 2 and loaded into registers A3, MC3 and MP3 at the beginning of phase 3 (end of phase 2) as required by the instruction in the register IREG-2. The content of the register A3 may be transferred to the register A4 at the end of phase 3 if required by the instruction then in register IREG-3. Similarly, the content of the register A4 may be transferred to the register A5 as required by the instruction then in the register IREG-4. The registers AL6 and AR6 of the ALU are loaded at the end of phase 5. During phase 6, the ALU performs the operation required by the instruction then advanced to the register IREG-6. At the end of phase 6, the output of the ALU may be either fed back to the register AL6, stored in one of a plurality of general purpose registers GPRs, or stored in one of five buffers, which interface with the five auxiliary memories, at the end of phase 7, data in one of the buffer registers is transferred to a memory as required by the instructions in the last stage of the control pipeline, register IREG-7.

From the foregoing it is evident that data proceeding through one of several data pipelines will not always keep pace with the instruction with which it is associated, but will be in step with respect to every operation called for by the instruction, e.g. multiply.

This organization of the arithmetic unit 17 just described in general terms with reference to FIG. 3 is intended to be only one example of how it may be organized for processing of data in stages or phases, one phase corresponding to each phase of the control pipeline. Other arrangements specifically design to meet particular requirements and operating environments will, of course, occur to those skilled in the art. This exemplary arrangement is designed specifically for radar and sonar signal processing.

Figure 6:
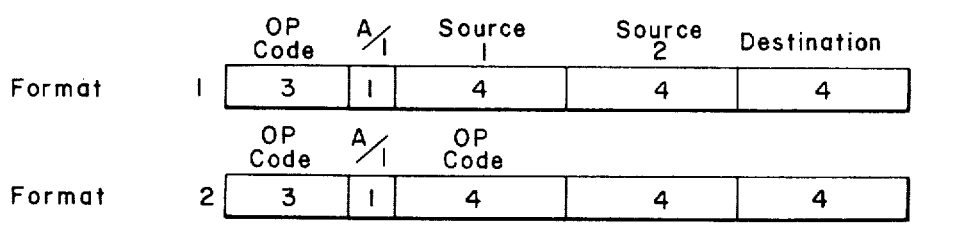
FIG. 6 illustrates instruction word formats for the system of FIGS. 1-5.
Figure 6:
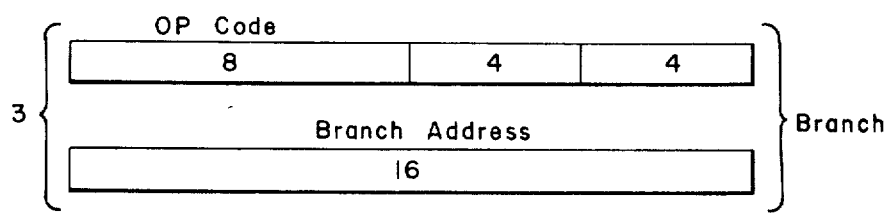

It is evident that the arrangement of dual pipelines for instructions and data to control business or scientific data processing can accommodate virtually any format for the instructions, and any operations desired to be carried out on the data. FIG. 6 illustrates a format for an exemplary implementation of the present invention which, in accordance with another novel feature of the present invention noted hereinbefore, contemplates indirect addressing for every instruction as will be described more fully hereinafter with reference to FIGS. 3 through 5.

Format 1 for multiaddress instruction words is primarily used for addition and subtraction of both real and complex numbers. The four bit address fields labeled Source 1, Source 2, and Destination, are used to specify general purpose registers (GPRs), special registers, or memories from which data is to be obtained and/or stored. The four bit fields represent absolute addresses in the case of GPRs and special registers only, and indirect addresses in the case of all memory locations. In other words, if a four-bit field is to be used to address a memory location, such as a source (S) of an operand, the four-bit field does not specify the memory location, and instead specifies a pointer register which has been preloaded to contain the address of the location intended in the memory. A single bit, $N_I$, following a three-bit operation (OP) code will, if set equal to 1, cause the pointer register specified by the four-bit source field S and the four-bit destination field D in the instruction to increment at the end of the memory access cycle. Thus the indirect addressing provided by every instruction can be caused to be automatically incremented so that, in processing data, such as arrayed radar data, highly iterative and structured operations may be carried out with little or no overhead in terms of instructions necessary to prepare for the next value in the array of values to be processed. Incrementing a pointer register may be by simply adding one to the contents thereof in the case of processing all of the values in the array of data in sequence, or by a number, for example 16, in the case of not processing all values, but only every 16th in the example.

If the indirect addressing is not to be automatically incremented, the single bit following the three-bit OP code is set to zero, and simple indirect addressing is then carried out. Direct addressing is not possible, but may be simulated with some overhead, by simply preloading the pointers with the addresses to which direct addressing is desired. Such would not be desired too often in highly iterative instructure operations characteristic of signal processing so that the automatically incremented, indirect addressing feature more than offsets the overhead incurred in those few times direct addressing is desired.

All other instructions except branch instructions, use format 2 which shows two four-bit addresses, one for the source (Source 2) of an operand, and one for the destination of the result of the operation called for. In the case of multiplication, a third field is implicit in the OP code (extended to 7 bits). The operand associated with the implicit third field is the multiplier which, as noted hereinbefore, has previously been loaded into the register MP3. As in the case of format 1, the automatic increment bit can be set to cause the memory pointers involved to increment following the memory access cycle.

In regard to format 3 used for all branch instructions, the first of two words, which must be read from memory in succession, is a 16-bit word containing the branch OP CODE and address of any registers required. The second is a 16-bit word containing the branch address (BA) for the next instruction. The two 4-bit fields used to address registers specify program control unit registers to be used with the instruction.

Referring to FIG. 1 an unconditional branch instruction BU, is decoded in the register IREG-2 while the branch address, BA, is in the register IREG-1. The decoder IDEC-2, which decodes the instruction BU, controls a multiplexer (bank of parallel gates) 16 to transfer in parallel the address BA to the program pointer. At the next clock pulse, the branch address is transferred to the program pointer 15 and the registers IREG-2 and IREG-1 are reset to zero, all under control of the decoder IDEC-2 thus inserting a NO-OP code in each of those registers. Otherwise, at that next clock pulse the register IREG-2 would contain the branch address which would be decoded as though it were an instruction. Resetting the register IREG-1 overrides the instruction that is otherwise entered from the program memory unit. At the very next clock time an instruction is read into the register IREG-1 from the memory location now specified by the program pointer. In that manner, the instruction BU effects an unconditional branch in the program being executed.

Figure 2:
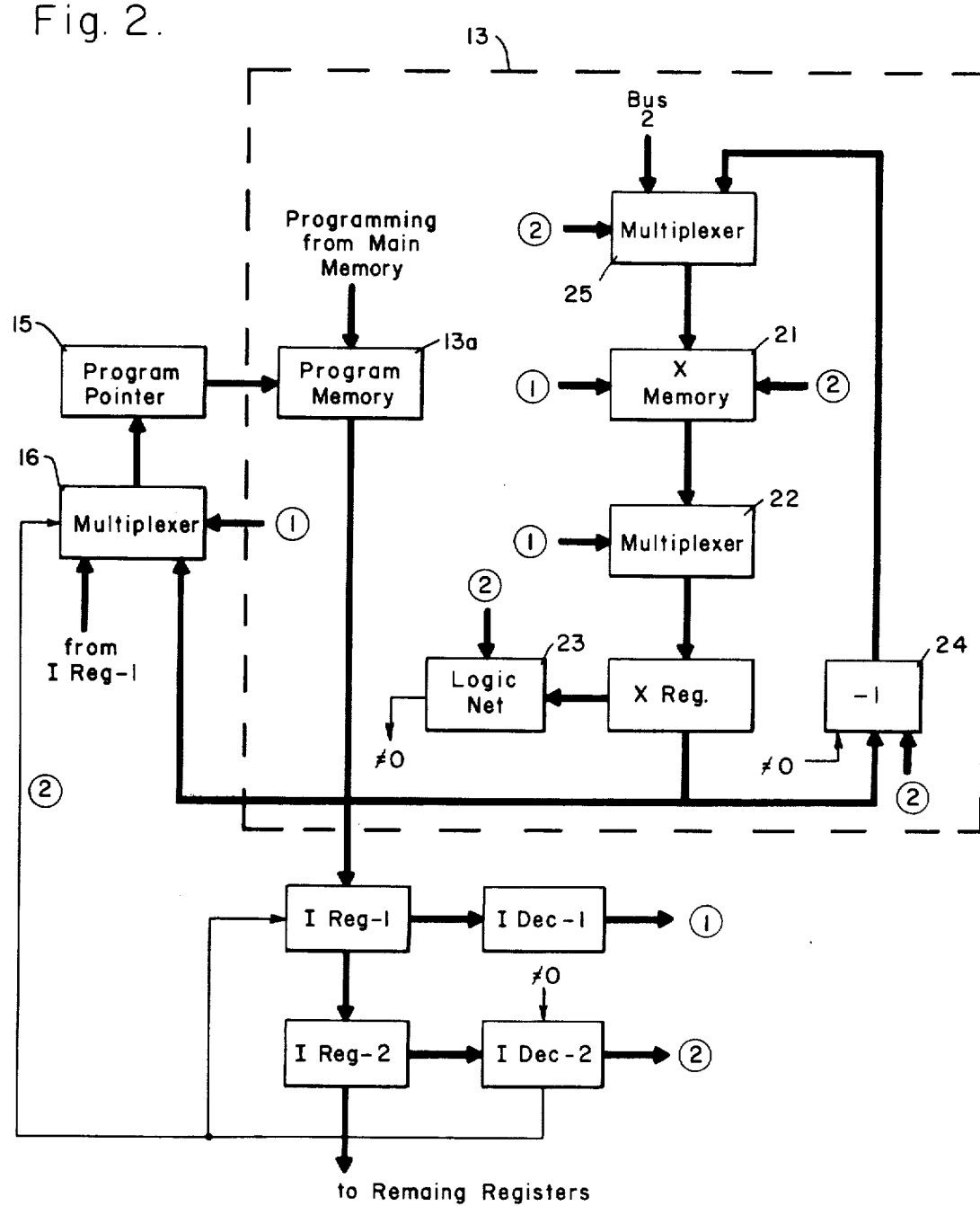
FIG. 2 is a block diagram showing the organization of a program memory unit which feeds instructions to the control pipeline shown in FIG. 1.

An exemplary arrangement of hardware in the program memory unit 13 will now be described with reference to FIG. 2 to show how conditional branch instructions may be also expected by transferring through the multiplexer 16 a branch address into the program pointer 15. For example, to set up a loop of instructions using an X register in the program memory unit as a counter, a branch and count instruction, BCTX, read from the program memory 13a into the register IREG-1 is used to test the content of that X register, and if it is not equal to zero, it is decremented and the branch is taken to again execute an iterative loop. It should be noted that with automatically incremented, indirect addressing provided in the arithmetic unit 17, the next loop processes another value of data. The content of the X register is first preset to the number of values in a block or array of data to be processed using the same iterative loop. Once the X register has been decremented to zero the branch of the instruction BCTX is not taken, and execution of instructions continues beyond the loop.

The instruction is decoded in the register IREG-1. That instruction contains the address $X_i$ in an X memory 21 in the program memory unit. At the next clock pulse, the instruction BCTX is transferred to the register IREG-2 while the branch address BA, is entered in the register IREG-1 and the content of the memory location $X_i$ is transferred from the X memory into the X register through a multiplexer 22. The decoder IDEC-1 controls the multiplexer 22 for that purpose.

During the next phase, 2, the content of the X register is examined in a logic network 23 to determine if it is equal to zero, and if not equal to zero, a signal ($\neq 0$) allows the next clock pulse to cause the branch address to be transferred from the register IREG-1 to the program pointer through the multiplexer 16 and the registers IREG-1 and IREG-2 to be reset to zero as in the case of executing an unconditional branch instruction. At the same time, the content of the X register is decremented by 1 by a parallel subtractor 24 which subtracts one from the content of the X register, and the result is stored in the X memory through a multiplexer 25.

Other forms of branch instructions may be similarly implemented through the program memory unit. Branch instructions provide the facility to repeat a sequence of instructions a number of times using the X register to keep track of the number of times the sequence is executed. With automatically incremented indirect addressing, the sequence of instructions will process a different value of data. The X register can also be used to implement other types of instructions. Additionally, the content of the X register can be transferred to the program counter by a transfer instruction in the instruction register IREG-1, such as to preset the program pointer to a predetermined value loaded into the X register from the X memory in response to a preceding load instruction.

The concept of automatically incremented indirect addressing of instructions will now be described with reference to FIGS. 3 and 4. In FIG. 3, the arithmetic unit 17 is shown receiving data to be processed from data sources 31 (which may be either one of the input memories) with the result of the data processing being outputed to data sinks 32 (which may be any one of the auxiliary memories). The indirect addresses of the operand source and result destination contained in a given instruction are received from the instruction decoders IDEC-1 and IDEC-7 during the respective first and seventh phases of the control pipeline. The source indirect address selects one of a plurality of pointers 33 and the destination indirect address selects one of a plurality of pointers 34. Each time the pointers 33 and 34 are thus addressed by indirect addresses, the direct addresses read out of the selected pointers (to control the data sources and data sinks) are restored in the pointers 33 and 34 respective increment logic networks 35 and 36. In that manner, when the same instruction is again being executed for the next data value in a block or array of data, the direct addresses contained in the pointers 33 and 34 point to other data source and data sink locations. In the simplest case, the incrementers 35 amnd 36 merely add 1 to the direct addresses being restored in the respected pointers. In practice, however, the concept is implemented to permit programmed control of the value by which the indirect addresses are incremented. This may be accomplished by providing static registers 37 and 38 to store the value. The static registers are, of course, preloaded under program control. Each increment logic network is then implemented as a parallel adder to hold the content of a static register to a direct address as the address is restored in the pointer from which read. The address as read is stored in an address register associated with the memory addressed.

Figure 4:
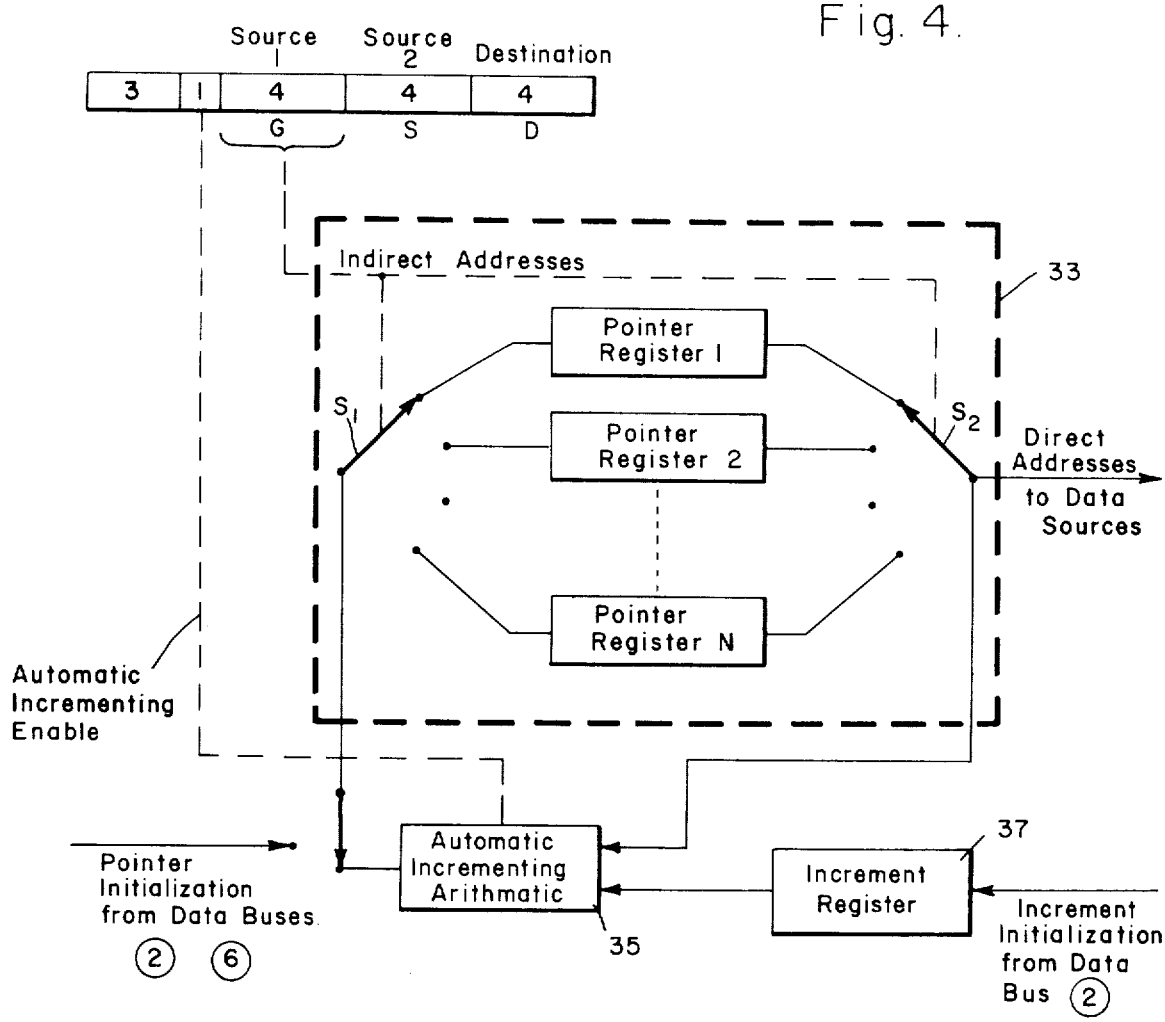
FIG. 4 illustrates schematically a arrangement for the automatically indexed, indirect addressing system of FIG. 3.

Each of the pointers 33 and 34 consists of a plurality of pointer registers as illustrated schematically in FIG. 4 for the source pointers 33. The source field of the instruction is decoded to select one of the pointer registers which has been preloaded with the desired direct address. The selection is schematically illustrated by mechanical switches S1 and S2, but in practice, the selection is implemented with electronic gates for parallel transfer out of the direct address and transfer in one of the incremented direct address. When the fourth bit of the instruction is set equal to one, the automatic incrementing logic 35 is enabled so that as the direct address is restored in the pointer from which read, the content of the increment register 37 is added. The increment register 37 is preloaded by an instruction during phase 2 of the instruction control pipeline and the selected pointer register is set to the initial value from a data bus during phase 6 or 2 of an appropriate instruction. The initializing instructions are simply transfer instructions which transfer from designated memory locations to the designated registers, and instructions to load a pointer register from a data bus during phase 6, for example, enables gates represented by a switch S3 to permit loading the pointer from the data bus. Note that the transfer instruction sets up the gates represented by the switches S1 and S3 during phase 6. Otherwise the gates represented by the switch S1 are enabled for loading the designated pointer register from the automatic incrementing logic 35 during the execution of an instruction which is decoded to enable the gates represented by the switches S1 and S2 during phase one of the control pipeline.

Operation of the exemplary organization of the arithmetic unit 17 for automatically incremented, indirect addressing in conjunction with dual pipelines for instruction and data will now be described with reference to FIGS. 3 and 5. As an instruction travels down the control pipeline in response to 20 MHz clock pulses the necessary hardware is enabled to perform the desired function dictated at each level of the pipeline as described hereinbefore with reference to FIG. 1. The circled numbers in FIGS. 3 and 6 indicate the corresponding level of the arithmetic unit enabled by the instruction in the same number instruction register as shown in FIG. 1. The control pipeline thus optimizes use of hardware in the arithmetic unit by dedicating the use of each piece of hardware for one phase of an instruction to only one control clock cycle.

Figure 5:
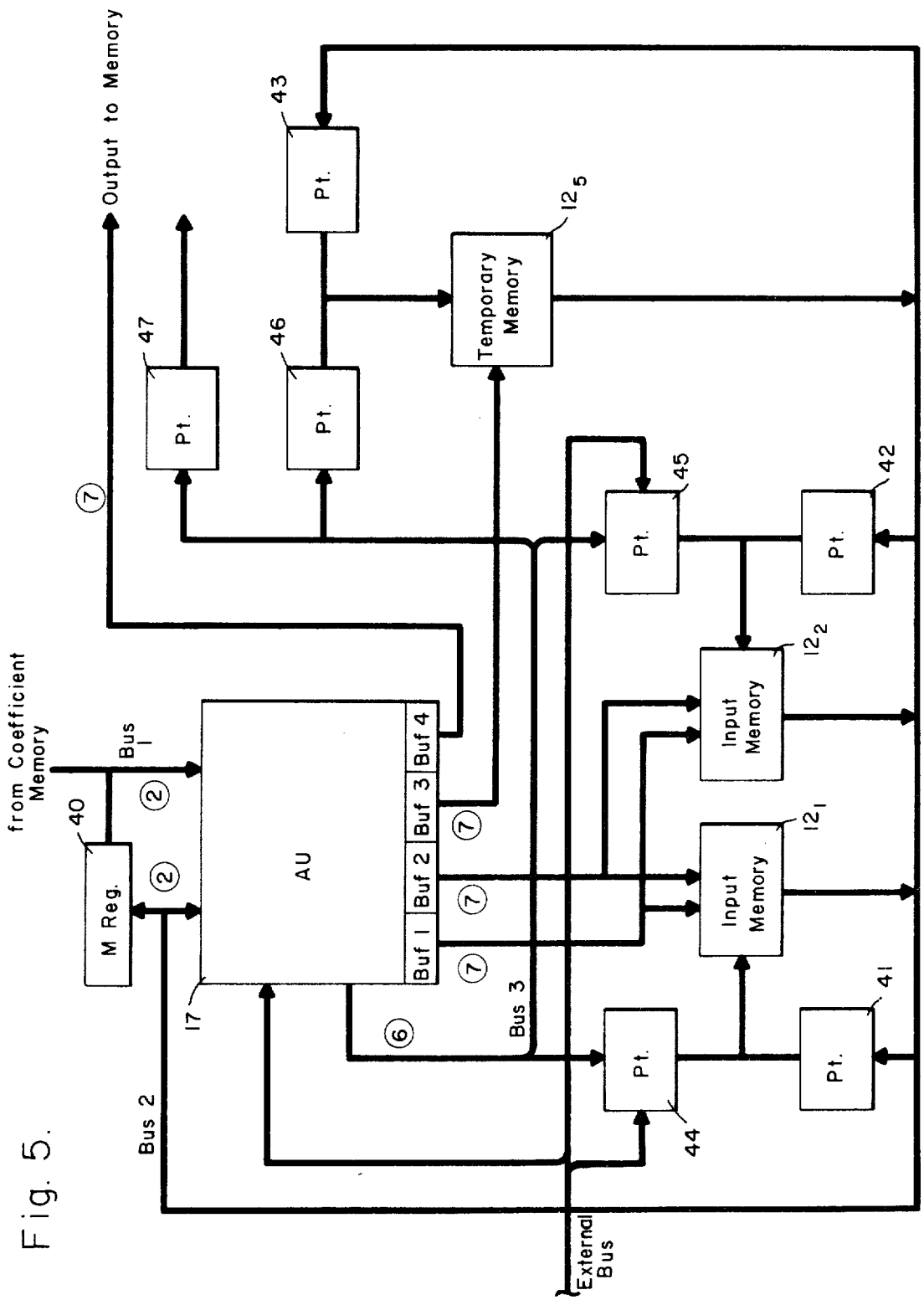
FIG. 5 is a block diagram of an arithmetic unit incorporating the automatically indexed, indirect addressing system of FIG. 4 in the arithmetic unit of FIG. 3.

Bus designations are indicated in FIGS. 3 and 5 for convenience of discussion. Bus 1 provides the multiplier to the input rregister MP3 of the multiplier unit MUL from an M register 40 or a special auxiliary memory (not shown) if provided for blocks or arrays of coefficients. In practice, multipliers may be fetched from the coefficient memory in a manner similar to which after operands are fetched from input memories $12_1$ and $12_2$ when one is provided for that purpose, such as when it is desired to multiply each value in a block or array of data with a separately specified coefficient. In that event, as the selected one of the input memories $12_1$ and $12_2$ is providing the data in sequence to automatically incremented indirect addressing, the corresponding coefficients may be read from the specially dedicated coefficient memory which would also be provided with automatically incremented indirect addressing in the same manner as the input memories. The primary source for a multiplier, the M register, is preloaded with the multiplier using a transfer instruction.

Bus 2 provides either a multiplicand to the left multiplier register MC3 or a value to the right hand register AR6 of the arithmetic and logic unit ALU. Bus 2 also provides a path to memory pointers 41, 42 and 43 (FIG. 5) associated with the respective input memory $12_1$, input memory $12_2$, and temporary memory $12_4$ since data appearing on the bus can contain starting addresses or increment values for the pointers. These pointers are, assumed to be implemented with a single register for each pointer, but as noted hereinbefore with reference to FIG. 4, each pointer may be comprised of a plurality of registers.

Bus 3 provides data from the ALU to auxiliary pointers 44, 45, and 46, or to an output pointer 47 (FIG. 5). The latter is used in the same manner as an input pointer, such as the pointer 41, for automatically incremented indirect addressing of the output memories, and may be set to point to one of the two output memories since only one of the two output memories will be used at any given time or any other of the auxiliary memories. Two input memories, each with two input pointers, permits one memory to be dedicated to internal data processing leaving the other under control of the main CPU. When one set of operations is being performed, the alternate input memory can be loaded by the CPU so that the second input memory can be switched in without loss of continuity with regard to signal data processing. Switching the roles of the input memories can be useful since the input memories feed bus 2 directly without necessary pointer information to begin a new set of operations without the delay of reloading a single memory. Mode control by the main CPU determines which memory is accepting data through bus 3 or placing data on bus 2.

The input memory pointers 44 and 45 may be used while loading the input memories directly through an external input bus under control of the CPU. The pointer 46 associated with a temporary memory is similarly used to load the temporary memory, but the data being loaded is processed data on bus 3. These pointers, as well as the output pointer 47, are assumed to also be implemented with just one register for each pointer, but may also be implemented with a plurality of registers from which only one is selected for use at any given time.

All of the pointers are used as simple automatically incremented pointers, where the incrementing value is 1, while data is being loaded from either an external input bus or internal buses 2 and 3. The pointers are used in a more powerful way during data processing operations since they can be incremented by any preset value, such as 16. In practice only the pointers 41, 42, 43 and 47 will be so used. In the event of an interrupt during processing, the states of these pointers would be stored, as is the common practice in data processing systems, in order to be able to return to the data processing interrupted.

A pointer for the coefficient memory, if a coefficient memory is provided, is implemented in a manner similar to the pointers for the input memories for the purpose of reading coefficients out, but coefficients are loaded into the coefficient memory by the main CPU in a manner similar to loading the program memory 13a.

Regarding the output memories, while one memory is outputing data to the main memory under control of the CPU, the other is free to accept the next set of output data from the arithmetic unit. The addressing of the memory dedicated to receive the process data is similar to the addressing of the temporary memory. Separate addressing means is then used by the CPU to unload the other output memory. While the one being loaded is subsequently unloaded, the other previously unloaded is then used to accept data from the arithmetic unit. The addressing of the output memories can be simplified by using separate pointers for the two memories.

In summary, the concept of the present invention illustrated in FIG. 1 is capable of being easily implemented to advantage in any data processing system, particularly radar or sonar signal data processing systems employing highly iterative and structured operations. The algorithms employed in the arithmetic unit may be selected independently of the present invention. All that would be required would be to combine the data processing paths such that registers are time shared whenever possible, and provide sufficient phases or stages in the instruction processing path to accomodate the algorithy requiring the largest number of phases. As to the input, output and temporary memory, they need not be specifically dedicated for use as input, output or temporary memory. Programming flexibility may require using any auxiliary memory in any one of the three codes indicated. However, in the exemplary embodiment described with reference to FIG. 5, some restrictions are imposed on the use of the auxiliary memories to limit the hardware for economy.

The temporary memory 12₅ may be loaded only through the AU. Processed data is stored in that memory in phase 7. Any other data to be stored in that memory can be stored by a transfer instruction executed in phase 2. The input memories 12₁ and 12₂ may be loaded through the AU in the same way, or from an external bus through the output buffer BUF1. The output memories 12₃ and 12₄ can only be loaded through the AU. It is contemplated that only processed data will be stored in those memories. From there the processed data is transferred to the main memory by the CPU shown in FIG. 1.

Only one pointer 47 having a single register, is dedicated to the two output memories since only one memory will be receiving processed data at any given time. The other output memory is being emptied into the main memory during that time. All other auxiliary memories have two pointers, each having a single register for automatically incremented indirect addressing. Some restrictions are imposed by the specific organization illustrated of which the programmer must be aware, but such restrictions do not limit the concept of the invention as it relates to indirect addressing, they merely illustrate the concept in a specific embodiment. The restrictions are that the pointers 41, 42 and 43 can only be initialized through bus 2 by a transfer instruction executed in phase 2. The pointers 44, 45, may be initialized through the external input bus or bus 3 during phase 6 of the AU execution of an instruction. That permits those pointers to be initialized with values calculated by the AU. The pointers 46 and 47 can also be initialized through bus 3 so that those pointers will be used when the initial values are calculated by the AU.

The addressing paths to the pointers are not shown in FIG. 5, but from the description of FIGS. 3 and 4 it is understood that they are addressed during phase 1 of phse 6 by an instruction, depending upon whether a memory is to be accessed as a data source or a data sink. If the same memory is to be addressed for both reading and storing data by separate instructions simultaneously transferred into registers IREG-2 and IREG-7, the instruction to read is executed while all other instructions are held up one clock pulse period, as described with reference to FIG. 1. In that way conflict is resolved between two paired pointers which seek to address the same memory, such as pointers 44 nd 41 which address the same memory 12₁ over the same path shown as output from the pointers to the memory.

In view of the foregoing, it is evident that many variations in the use of the present invention, will occur to those skilled in the art. Consequently, it is intended that the following claims be interpreted to include all such variations which embody the present invention.

We claim:

1. A processing system comprising:
   a source of instructions wherein each instruction is capable of containing one or more indirect addresses or data containing one direct address;
   a plurality of data memories for storng input and output data for said processing system and providing direct addresses;
   processing means coupled to said source of instructions and said plurality of data memories for processing data from said plurality of data memories according to the instructions from said sources of instructions and for generating direct addresses when instructed by said source of instructions;
   first pointer means comprising a plurality of first pointers each coupled to said data memories, to said processing means and to said source of instructions, said first pointers each comprising a plurality of first pointer register means each of which stores one direct address whereby said first pointer means receives indirect addresses from said source of instructions to address one first pointer register means to fetch data from one of said plurality of data memories for said processing means; and
   second pointer means comprising a plurality of second pointers each coupled to said data memories, to said processing means and to said source of instructions, said second pointers each comprising a plurality of second pointer register means each of which stoes one direct address, whereby said second pointer means receives indirect addresses from said source of instructions to address one second pointer register means to store data from said processing means in one of said memories.

2. The system of claim 1 in which each of said first pointers includes means coupled to said first pointer register means for automtically incrementing the direct address when said address is read from said first pointer and storing the incremented direct address in said first pointer for the next address in said data memories, and
   each of said pointers includes means coupled to second pointer register means for automatically incrementing the direct address when said address is read from said second pointer and storing the incremented direct address in said second pointer for the next direct address in said data memories.

3. The system of claim 2 in which said instructions include an automatic increment code and in which said first and second pointer means include automatic incrementing means responsive to said automatic increment code to control incrementing of the plurality of pointer register means in said first and second pointer means.

4. The system of claim 2 in which each of said first and second plurality of pointers includes an increment register for storing a value for incrementing the direct address in the corresponding plurality of pointer register means.

5. A system comprising:
   a source of instructions with selected instructions including at least one indirect address or data containing one direct address;
   storage means for storing input and output data and for providing direct addresses;
   processing means coupled to said source of instructions and to said storage means for processing data from said storage means according to instructions from said source of instructions and for generating direct addresses;
   first means coupled to said processing means and to said storage means for storing said direct addresses from said storage means or said processing means and providing said direct address to said storage means in response to the indirect address of said selected instructions; and
   second means coupled to said first means for automatically incrementing the direct address read from said first means by a predetermined value each time it is read therefrom with said incremented direct address being stored in said first means as a subsequent direct address.

6. The combination of claim 5 in which said selected instructions include an automatic increment code and said second means includes means responsive to said automatic increment code for being controlled to increment said direct address.

7. The combination of claim 6 in which said second means includes register means for storing values to increment said direct address in response to the indirect address of said instruction.

* * * * *